Dec. 24, 1940. N. B. COHEN Re. 21,669
HEATING APPARATUS
Original Filed April 30, 1937
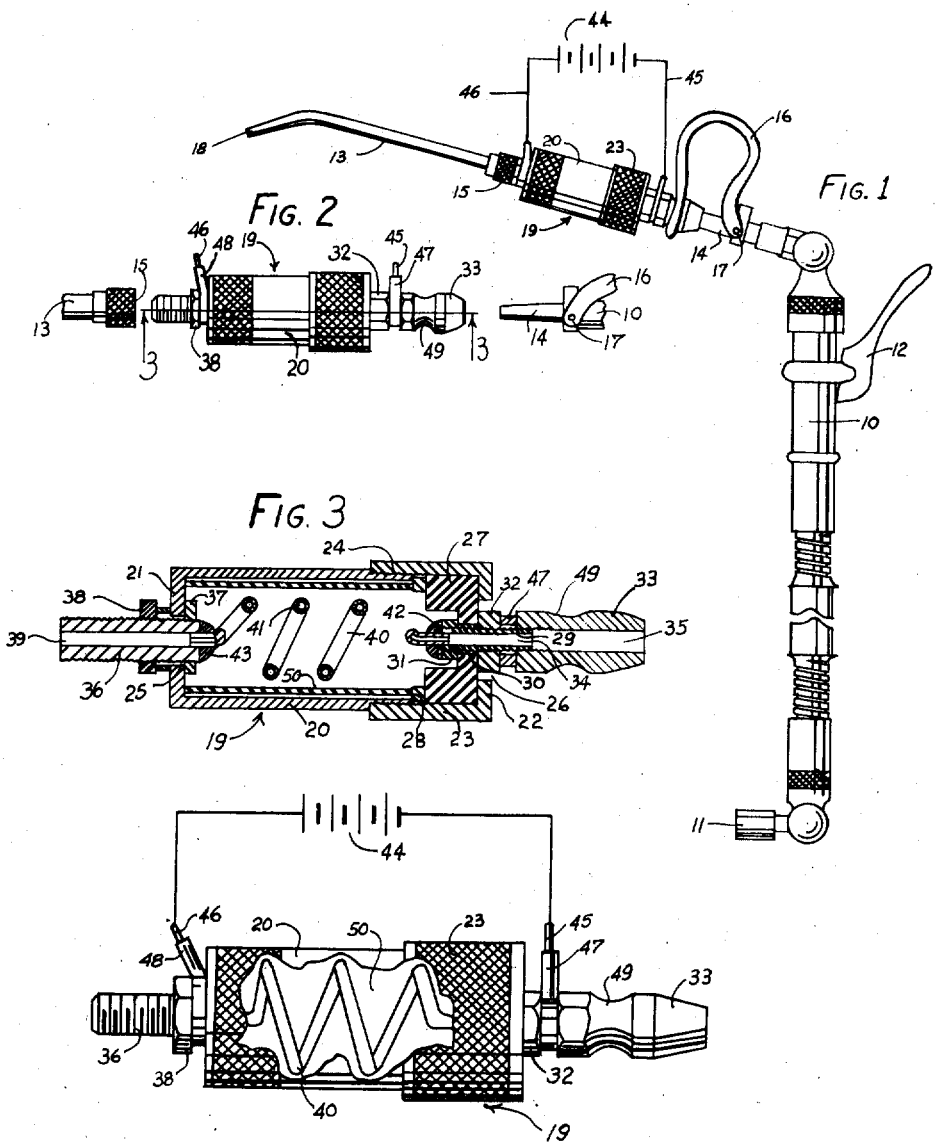
INVENTOR
NATHAN B. COHEN
BY G. H. Braddock
ATTORNEY Reissued Dec. 24, 1940

Re. 21,669

UNITED STATES PATENT OFFICE 21,669

HEATING APPARATUS

Nathan B. Cohen, Minneapolis, Minn.

Original No. 2,109,900, dated March 1, 1938, Serial No. 139,967, April 30, 1937. Application for reissue June 17, 1939, Serial No. 279,767

14 Claims. (Cl. 219—39)

This invention relates to a heating apparatus, and has especial reference to a heating apparatus for employment in connection with a device of the type used by dentists for applying a fluid, such as air or water, to the interior of the mouth of a patient.

An object of the invention is to provide a heating apparatus which will include an element of novel and improved construction for warming or heating a fluid, such as air, or water, made to travel past said element in contact therewith.

A further object is to provide a heating apparatus which will include a tubular element adapted to become heated by offering resistance to the passage of electrical energy therethrough and to in turn cause a fluid, such as air or water, made to travel through said tubular element to become warmed or heated by absorption of heat from the heated tubular element.

A further object is to provide a heating apparatus which will include an electrical resistance element constituted as a tubular entity through which a fluid, such as air or water, to be warmed or heated can be made to flow in such manner that said tubular resistance entity or element will, when at elevated temperature by reason of the application thereto of electrical energy, impart heat to said fluid during its travel through the passageway of the tubular entity or element and thus cause the fluid to become warmed or heated.

A further object is to provide a device of the general type as used by dentists for applying a fluid, such as air or water, to the mouth of a patient, which will include a conduit for conveying the fluid employed from a source of supply of said fluid, an instrument with passageway for delivery of the fluid received from said conduit to the place of use of said fluid, as in the mouth of a patient, and an apparatus for causing the fluid to be warmed or heated during its passage from said conduit to said instrument.

A further object is to provide a device for accomplishing the travel of a fluid, such as air or water, from a source of supply of the fluid to a location of use thereof, which will include a conduit for conveying the fluid from its source, an instrument with internal passageway for delivering the fluid conveyed by said conduit to said location of use, and a heating apparatus connected between said conduit and said instrument adapted to transport said fluid from the conduit to the instrument and to cause the fluid to become warmed or heated during its passage through said heating apparatus by the absorption of heat therefrom.

A further object is to provide a device for accomplishing the travel of a fluid from a source of supply of the fluid to a location where said fluid is to find use, which will include a conduit for conveying the fluid from its source, an instrument for delivering the fluid conveyed by the conduit to said location where the fluid is to find use, a heating apparatus adapted to transport the fluid from said conduit to said instrument and to cause the fluid to be warmed or heated by absorption of heat from said heating apparatus, and means for detachably connecting the heating apparatus between the conduit and the instrument of said device.

A further object is to provide a device for accomplishing the travel of a fluid from a source of supply of the fluid to a location of use thereof, which will include a conduit for conveying the fluid from its source, an instrument for delivering the fluid conveyed by the conduit to said location of use, and a heating apparatus connected between said conduit and said instrument and including an electrical resistance element constituted as a tubular entity adapted to transport the fluid from the conduit to the instrument in such manner that said tubular resistance entity or element will, when at elevated temperature by reason of the application thereto of electrical energy, impart heat to said fluid while traveling through the passageway of the tubular entity or element and thus cause the fluid to become warmed or heated.

A further object is to provide a heating apparatus of the present character wherein will be incorporated improved features of construction.

And a further object is to provide a device of the general type employed by dentists for applying a fluid to the mouth of a patient, which will include improved features and characteristics of construction novel both as individual entities of the device and in combination with each other.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is an elevational view of a device of the general type as used by dentists for applying a fluid to the mouth of a patient and made according to the principles of the invention;

Fig. 2 is an elevational view, on a slightly enlarged scale, disclosing a fragment of the conduit, the heating apparatus and a fragment of the instrument of the device of Fig. 1 in disassembled relationship;

Fig. 3 is an enlarged, central, longitudinal sectional view of the heating apparatus, taken on line 3—3 in Fig. 2; and Fig. 4 is an elevational view, partially broken away, of the heating apparatus of Fig. 3, the view additionally including a battery and wiring connections between said battery and the tubular resistance element of said heating apparatus.

With respect to the drawing and the numerals of reference thereon, a conduit 10 is a part of a device of the general type as used by dentists for delivering fluid, ordinarily air, from a source of supply (not shown) of the fluid, the conduit 10 includes an end portion 11 thereof for attachment with said source of supply, and also includes a hand operated valve, represented generally at 12, for controlling the flow of fluid through the conduit.

An instrument 13 of the device is for delivering fluid which passes through the conduit 10 to a place of use of said fluid, as, for example, the interior of the mouth of a dentist's patient. A device of the general character as so far briefly described is ordinarily employed by dentists with the instrument 13 connected, usually detachably, directly to the conduit 10. The detachable connection is, in some instances, provided by inserting the end portion 14, opposite the end portion 11, of the conduit 10 directly into the inner end 15 of the instrument 13, and removably retaining said instrument 13 in its inserted position by employment of a hook member 16 pivoted, as at 17, upon said conduit. The instrument 13 of course includes an internal passageway extending through said instrument from its inner or fluid receiving end 15 to its delivery end 18.

A heating apparatus 19 made according to the invention is adapted to be inserted and connected between the conduit 10 and the instrument 13 in such manner as to be capable of conveying fluid from the outlet end of said conduit 10 to the inlet or fluid receiving end 15 of said instrument 13 and of causing the fluid to become warmed or heated during its passage through said heating apparatus.

As disclosed, the heating apparatus 19 includes a shell consisting of a hollow cylindrical member 20 with base 21, and a cap composed of a body portion 22 with annular flange 23 thereon threaded upon said hollow cylindrical member, as at 24. The base 21 of the cylindrical member 20 includes an opening 25, and the body portion 22 of the cap includes an opening 26 in longitudinal alinement with said opening 25. A porcelain plug 27 is disposed within the shell, and an annular element 28 engaged between the porcelain plug and the inner end of the hollow cylindrical member 20 maintains said porcelain plug in fixed position in said shell, confined between said annular element 28 and the body portion 22 of the cap as disclosed.

An externally threaded pipe 29 of conducting material extends longitudinally of the shell. The pipe 29 is secured in an opening 30 in the porcelain plug 27 by means of an inner and an outer nut, denoted 31 and 32, respectively, upon said pipe 29 and engaged with opposed surfaces of said porcelain plug. The porcelain plug 27 maintains the externally threaded pipe 29 and the nuts 31 and 32 in spaced relation to said shell and its cap. The outer end portion of the pipe 29 threadably receives a fitting 33, and said pipe 29 and said fitting 33 have internal alining passageways, designated 34 and 35, respectively.

An externally threaded pipe 36 of conducting material also extends longitudinally of the shell. The pipe 36 is secured in the opening 25 of the base 21 by means of an inner and an outer nut, represented 37 and 38, respectively, upon said pipe 36 and adjacent to opposed surfaces of said base 21. The pipe 36 has an internal passageway 39.

An electrical resistance element of the heating apparatus is constituted as a tubular entity 40 of any material suitable to the purpose. By way of example, a material which can be satisfactorily employed to provide the tubular entity or element 40 is "Inconel," so-called. Said tubular entity or element 40 has a continuous internal passageway 41 therethrough. As disclosed, the tubular entity or element 40 is in the form of a continuous coil, as will be very clear from Figs. 3 and 4. The opposite end portions of said tubular entity or element are soldered, welded, or otherwise secured, as indicated at 42 and 43, to the externally threaded pipes 29 and 36, respectively, in such manner that the passageways 35, 34, 41 and 39 provide one continuous passageway for fluid, such as air or water, as will also be clear from said Figs. 3 and 4. The hollow cylindrical member 20 of the shell is desirably lined with mica or equivalent material 50.

Any suitable means may be employed for applying electrical power to, or energizing, the tubular entity or element 40. As shown, an electric battery 44 is utilized for the purpose mentioned. Lead wires 45 and 46 extend from the battery 44 to the externally threaded pipes 29 and 36, respectively, a conducting clip 47 attached to the lead wire 45 being situated upon the pipe 29 and confined between the nut 32 and the fitting 33, and a conducting clip 48 attached to the lead wire 46 being situated upon the pipe 36 and confined between the nut 38 and the base 21 of the hollow cylindrical member 20. One of the lead wires 45 or 46 can include an electric switch (not shown) for making and breaking a circuit for said tubular resistance entity or element 40.

The heating apparatus 19 is operatively, detachably connected with the conduit 10 by insertion of the end portion 14 of said conduit into the adjacent end of the passageway 35 through the fitting 33 and retention of said end portion 14 in said passageway 35 by engagement of the hook member 16 with an annular groove 49 in the wall of said fitting. Said heating apparatus 19 is operatively, detachably connected with the instrument 13 by screwing the outer end portion of the externally threaded pipe 36 into an internal thread (not shown) of said instrument at or adjacent to the inlet or fluid receiving end 15 thereof. Obviously, the fitting 33 and the instrument 13 can be composed of insulating material.

A fluid, such as air or water, upon being released from the conduit 10 by opening the hand operated valve 12 will evidently pass out of the delivery end of the instrument 13 from said conduit by way of the tubular resistance entity or element 40 when the heating apparatus 19 is inserted and connected between said conduit 10 and said instrument 13 in the manner as set forth and as disclosed in Fig. 1 of the drawing. Provided the tubular resistance entity or element 40 is energized and thus caused to be heated by reason of the application thereto of electrical current, as from the battery 40, heat will be imparted or transmitted to the fluid during its travel through said tubular resistance entity or element, as will be apparent. Otherwise stated, a fluid made to travel through the interior passageway 41 of the entity or element 40 when hot will absorb heat from the heated resistance entity or element and thus itself become warmed or heated. Inasmuch as the electrical resistance entity or element 40 is in proximate relation to the delivery end 18 of the instrument 15, a fluid caused to be heated at said heating apparatus will not become cooled in the short space of time required for the fluid to traverse the length of the instrument. Thus the fluid will be delivered from the instrument 13 while at elevated temperature. Clearly, the fluid can be delivered at any desired and predetermined temperature by control of the temperature of the electrical resistance entity or element, or the length of time the fluid is in contact with said entity or element, etc.

Attention is specifically called to the fact that the heating apparatus 19, and its novel and improved tubular resistance entity or element 40, can be employed for heating a fluid, or fluids, adapted to be used for a variety of purposes, and while I have herein disclosed said heating apparatus in novel combination as a part of a particular device, there is no intention of limiting the invention to said device, it being my purpose herein to claim and protect the heating apparatus illustrated and described per se, as well as in combination in a device of the character disclosed. Broadly, the tubular resistance entity or element 40 when energized and thus heated will cause any fluid, air or water or other fluid, made to travel through the passageway 41 of said entity or element to become heated or warmed by absorption of heat from the novel and improved entity or element.

As far as the novel and improved device, including the conduit 10, the heating apparatus 19 and the instrument 13, is itself concerned, there is no intention herein of limiting said heating apparatus 19 for all purposes of use of said device as specifically including a tubular resistance element, it being apparent that a heating apparatus including a non-tubular resistance element might be inserted and connected between a conduit such as 10 and an instrument such as 13 to the accomplishing of advantageous results in some instances of use of the device.

What is claimed is:

1. A heating apparatus comprising a tubular shell including a head at each end thereof, a fluid conveying pipe of conducting material fixed in each of said heads, and an electrical resistance element constituted as a tubular entity within said shell and having a longitudinally extending internal passageway through which a fluid is adapted to be made to flow, the opposite end portions of said electrical resistance tubular entity being secured to said pipes, respectively, in such manner that the pipes and the electrical resistance tubular entity are in fluid conveying and current conducting relation to each other.

2. A heating apparatus comprising a tubular shell of rigid material including a head at each end of the shell, said heads being in spaced apart relation to each other, a hollow fluid conveying member of conducting material adjacent each of the opposite ends of said tubular shell, each of said hollow fluid conveying members including a portion thereof at the interior of the tubular shell and said portions of the hollow fluid conveying members at the interior of said tubular shell being in spaced apart relation to each other, means securing each of said hollow fluid conveying members in each of said heads, outer portions of the hollow fluid conveying members opening outwardly of said tubular shell, and an electrical resistance element constituted as a tubular entity within said tubular shell and having a longitudinally extending opening through which a fluid is adapted to be made to flow, the opposite end portions of said electrical resistance tubular entity being secured to the portions of the hollow members, respectively, within said tubular shell in fluid conveying and current conducting relation to said hollow members.

3. The combination as specified in claim 2, and insulating material at the interior of said tubular shell and in spaced and surrounding relation to said electrical resistance tubular entity.

4. A heating apparatus comprising a tubular shell including a head at each end of the shell, the material of the shell having sufficient rigidity to maintain said heads in fixed, spaced apart relation to each other, a hollow fluid conveying member of conducting material fixed in each of said heads and including an inner portion of the member at the interior of said tubular shell and an outer portion of the member at the exterior of the tubular shell, the inner portions of the hollow fluid conveying members, respectively, being in spaced apart relation to each other, and an electrical resistance element constituted as a tubular entity within said tubular shell in spaced relation to the shell, said electrical resistance tubular entity having a longitudinally extending opening therethrough through which a fluid is adapted to be made to flow, and the opposite end portions of the electrical resistance tubular entity being secured to the portions of said hollow members, respectively, within said tubular shell in fluid conveying and current conducting relation to the hollow members.

5. A device for accomplishing the travel of a fluid from a source of supply of the fluid to a location where said fluid is to be used, comprising a conduit for conveying the fluid from said source, an instrument for delivering the fluid conveyed by said conduit to said location, and a heating apparatus comprising a tubular shell including a head at each end of the shell, the material of the shell having sufficient rigidity to maintain said heads in fixed, spaced apart relation to each other, a hollow fluid conveying member of conducting material fixed in each of said heads and including an inner portion of the member at the interior of the tubular shell, said inner portions of the hollow fluid conveying members, respectively, being in spaced apart relation to each other, an outer portion of one of the hollow members being adapted to be communicated with by said conduit and an outer portion of the other of said hollow members being adapted to communicate with said instrument, and an electrical resistance element constituted as a tubular entity within said tubular shell in spaced relation to the shell, said electrical resistance tubular entity having a longitudinally extending opening therethrough through which fluid passing from said conduit to said instrument is adapted to be made to flow, and the opposite end portions of the electrical resistance tubular entity being secured to the portions of said hollow members, respectively, within said tubular shell in fluid conveying and current conducting relation to the hollow members.

6. A heating apparatus comprising a tubular shell including spaced apart walls, a fluid conveying member of conducting material fixed in each of said walls, and an electrical resistance element constituted as a tubular entity within said shell and having a longitudinally extending passageway through which a fluid is adapted to be made to flow, the opposite end portions of said electrical resistance tubular entity being secured to said fluid conveying members, respectively, in fluid conveying and current conducting relation to said members.

7. A heating apparatus comprising a tubular shell including spaced apart walls, a fluid conveying member fixed in each of said walls, and an electrical resistance element constituted as a tubular entity within said shell and having a longitudinally extending passageway through which a fluid is adapted to be made to flow, the opposite end portions, respectively, of said electrical resistance tubular entity terminating in adjacent relation to said spaced apart walls and being secured to said fluid conveying members, respectively, in fluid conveying relation to said members.

8. A heating apparatus comprising a tubular shell including spaced apart walls, a fluid conveying member fixed in each of said walls, and an electrical resistance element constituted as a tubular entity within said shell and having a longitudinally extending passageway through which a fluid is adapted to be made to flow, the opposite end portions, respectively, of said electrical resistance tubular entity terminating in adjacent relation to said spaced apart walls and being secured to said fluid conveying members, respectively, in fluid conveying relation to said members, and said electrical resistance tubular entity being in current conducting relation to at least one of said members.

9. A heating apparatus comprising a tubular shell including spaced apart locations, a fluid conveying member having inner and outer portions fixed to said shell at each of said locations, and an electrical resistance element constituted as a tubular entity within said shell and having a longitudinally extending passageway through which a fluid is adapted to be made to flow, the opposite end portions of said electrical resistance tubular entity being secured to said inner portions only of said fluid conveying members, respectively, in direct fluid conveying relation to said members, and said electrical resistance tubular entity being in current conducting relation to at least one of said members.

10. A heating apparatus comprising a tubular shell including spaced apart locations, the material of the shell having sufficient rigidity to maintain said locations in fixed relation to each other, a fluid conveying member having inner and outer portions fixed to said shell at each of said locations, and an electrical resistance element constituted as a tubular entity within said shell and having a longitudinally extending passageway through which a fluid is adapted to be made to flow, the opposite end portions, respectively, of said electrical resistance tubular entity terminating in adjacent relation to said spaced apart locations and being secured to said inner portions only of said fluid conveying members, respectively, in direct fluid conveying relation to said members, and said electrical resistance tubular entity being in current conducting relation to at least one of said members.

11. A heating apparatus comprising a tubular shell including spaced apart walls, the material of the shell having sufficient rigidity to maintain said walls in fixed relation to each other, a fluid conveying member rigid with each of said walls and having inner and outer portions, and an electrical resistance element constituted as a tubular entity within said shell and having a longitudinally extending passageway through which a fluid is adapted to be made to flow, the opposite end portions of said electrical resistance tubular entity being secured to said inner portions only of said fluid conveying members, respectively, in direct fluid conveying relation to said members, and said electrical resistance tubular entity being in current conducting relation to at least one of said members.

12. A heating apparatus comprising a tubular shell including spaced apart walls, a fluid conveying member fixed in each of said walls, and an electrical resistance element constituted as a tubular entity within said shell and having a longitudinally extending passageway through which a fluid is adapted to be made to flow, the opposite end portions, respectively, of said electrical resistance tubular entity terminating in adjacent relation to said spaced apart walls and being secured to said fluid conveying members, respectively, in fluid conveying relation to said members, and said electrical resistance tubular entity being in current conducting relation to at least one of said members.

13. A heating apparatus comprising a tubular shell including spaced apart locations, a fluid conveying member fixed to said shell at each of said locations and having inner and outer portions, and an electrical resistance element constituted as a tubular entity within said shell and having a longitudinally extending passageway through which a fluid is adapted to be made to flow, the opposite end portions, respectively, of said electrical resistance tubular entity terminating in adjacent relation to said spaced apart locations and being secured to said inner portions only of said fluid conveying members, respectively, in direct fluid conveying relation to said members, and said electrical resistance tubular entity being in current conducting relation to at least one of said members.

14. A heating apparatus comprising a tubular shell including spaced apart walls, the material of the shell having sufficient rigidity to maintain said walls in fixed relation to each other, a fluid conveying member rigid with each of said walls, and an electrical resistance element constituted as a tubular entity within said shell and having a longitudinally extending passageway through which a fluid is adapted to be made to flow, the opposite end portions, respectively, of said electrical resistance tubular entity terminating in adjacent relation to said spaced apart walls and being secured to said fluid conveying members, respectively, in fluid conveying relation to said members, and said electrical resistance tubular entity being in current conducting relation to at least one of said members.

NATHAN B. COHEN.